UNITED STATES PATENT OFFICE.

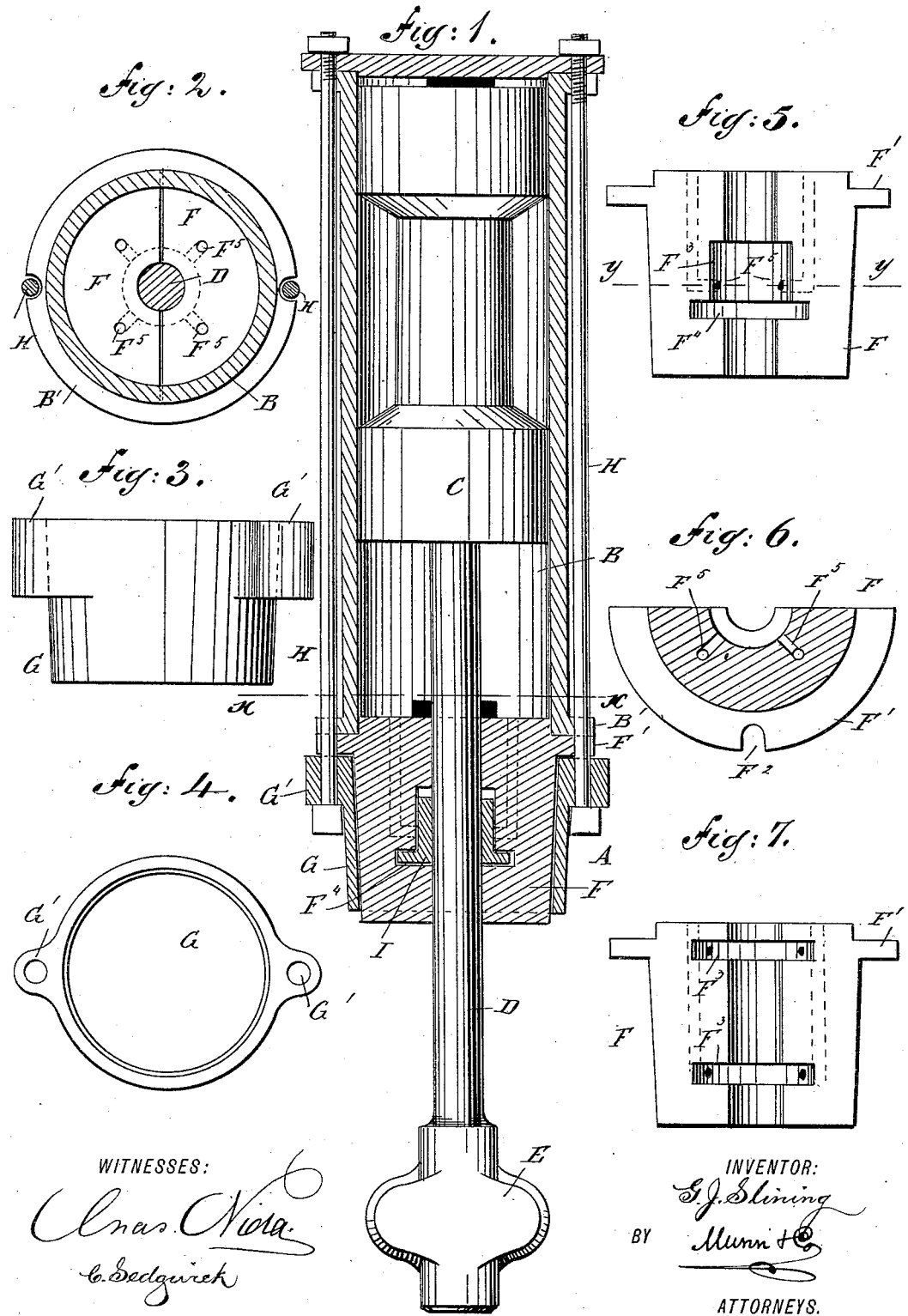

GEORGE J. SLINING, OF NEGAUNEE, MICHIGAN, ASSIGNOR OF ONE-HALF TO SAMUEL MITCHELL, OF SAME PLACE.

CYLINDER-HEAD FOR ROCK-DRILLS.

SPECIFICATION forming part of Letters Patent No. 437,051, dated September 23, 1890.

Application filed August 12, 1889. Serial No. 320,483. (No model.)

*To all whom it may concern:*

Be it known that I, GEORGE J. SLINING, of Negaunee, in the county of Marquette and State of Michigan, have invented a new and Improved Cylinder-Head for Rock-Drills, of which the following is a full, clear, and exact description.

The invention relates to rock-drills, and its object is to provide a new and improved cylinder-head which is simple and durable in construction, and can be used for fibrous or leather packing, thus permitting it to be employed on drills driven by steam or air.

The invention consists of a conical bushing made in two parts and containing the packing and a yoke fitting over the said bushing and holding it to the cylinder.

The invention also consists of certain parts and details and combinations of the same, as will be hereinafter fully described, and then pointed out in the claims.

Reference is to be had to the accompanying drawings, forming a part of this specification, in which similar letters of reference indicate corresponding parts in all the figures.

Figure 1 is a sectional side elevation of the improvement as applied. Fig. 2 is a sectional plan view of the same on the line $x\ x$ of Fig. 1. Fig. 3 is a side elevation of the yoke. Fig. 4 is a plan view of the same. Fig. 5 is a sectional side elevation of one-half of the bushing. Fig. 6 is a sectional plan view of the same on the line $y\ y$ of Fig. 5, and Fig. 7 is a side elevation of a modified form of one-half of the bushing.

The improved cylinder-head A is applied on the usual rock-drill cylinder B, containing the piston C, carrying the piston-rod D, extending through the cylinder-head A, and supporting on its outer end the chuck E, on which the drill-tool is secured.

The cylinder-head A is provided with a bushing F, made in two equal parts and provided with an annular flange F', fitting onto a corresponding flange B' of the cylinder B. In the center of the bushing F is formed an aperture, through which passes the piston-rod D, and the exterior of the bushing is made conical, and on it fits a similarly-shaped yoke G, provided with apertured lugs G', through which pass the bolts H, also passing through corresponding recesses $F^2$ in the flange F' of the bushing F. The bolts H are secured to the head on the other end of the cylinder B, and serve to hold the cylinder-head A to the cylinder B.

In the center of the bushing F are formed one or more recesses $F^3$, in which is placed the packing I, made either of leather or fiber, and serving to pack the piston-rod D, passing through the bushing F. As shown in Figs. 1 and 5, the packing I is provided with an annular flange, which fits into a corresponding annular recess $F^4$, formed in the bushing F, next to the recess $F^3$. The flange on the packing I securely holds the latter in place in the bushing. Into the recess or recesses $F^3$ open a series of channels $F^5$, extending inward and opening at their inner ends into the interior of the cylinder B, so that the motive agent in the latter can pass through the said channels into the recesses $F^3$ and press the packing I firmly in contact with the piston-rod D.

The bushing F is made in two parts on account of the piston-rod D carrying the solid chuck E and piston C. When the yoke G is placed over the split bushing F and the bolts H are drawn tight, the bushing is gripped very tightly and consequently held in place on the cylinder B.

It will be seen that the cylinder-head is very simple and durable in construction, consisting only of three parts, and can consequently be built very cheaply. The wear and tear on the cylinder-head is reduced to a minimum, and the head can easily be removed for inserting new packing when the latter is worn out.

Having thus fully described my invention, I claim as new and desire to secure by Letters Patent—

1. A cylinder-head comprising a split conical bushing provided with a recess or recesses for the reception of the packing, and channels leading to the said recess or recesses from the inner end of the bushing, so as to admit steam or air to the packing, and a packing held in the said recess or recesses, substantially as shown and described.

2. A cylinder-head comprising a split conical bushing provided with a recess or recesses for the reception of the packing, channels leading to the said recess or recesses from one inner end of the bushing, so as to admit steam or air to the packing, a packing held in the said recess or recesses, and a yoke fitting over the said conical bushing to hold the latter to the cylinder, substantially as shown and described.

GEO. J. SLINING.

Witnesses:
THOMAS PELLOW,
JOHN Q. ADAMS.